(12) United States Patent
Xu et al.

(10) Patent No.: US 8,554,050 B2
(45) Date of Patent: Oct. 8, 2013

(54) METHOD AND SYSTEM FOR CONTROLLING PLAYING OF MONITORING VIDEO RECORD

(75) Inventors: Lingmin Xu, Shenzhen (CN); Zhengxun Xia, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 201 days.

(21) Appl. No.: 13/120,647

(22) PCT Filed: Dec. 19, 2008

(86) PCT No.: PCT/CN2008/073626
§ 371 (c)(1),
(2), (4) Date: Mar. 23, 2011

(87) PCT Pub. No.: WO2010/034168
PCT Pub. Date: Apr. 1, 2010

(65) Prior Publication Data
US 2011/0235994 A1    Sep. 29, 2011

(30) Foreign Application Priority Data
Sep. 24, 2008 (CN) .......................... 2008 1 0216529

(51) Int. Cl.
H04N 9/80 (2006.01)
H04N 5/93 (2006.01)
H04N 5/92 (2006.01)

(52) U.S. Cl.
USPC ............................ 386/239; 386/353; 386/326

(58) Field of Classification Search
None
See application file for complete search history.

(56) References Cited

U.S. PATENT DOCUMENTS

2006/0170959 A1    8/2006  Mizoguchi
2007/0127773 A1*   6/2007  Ogawa .......................... 382/103

(Continued)

FOREIGN PATENT DOCUMENTS

CN    1444829 A     9/2003
CN    101198037 A   6/2008

(Continued)

OTHER PUBLICATIONS

Hossain, M. Julius, M. Ali Akber Dewan, and Oksam Chae, Suitability of Edge Segment Based Moving Object Detection for Real Time Video Surveillance, Department of Computer Eng.

(Continued)

*Primary Examiner* — William C Vaughn, Jr.
*Assistant Examiner* — Asher Khan
(74) *Attorney, Agent, or Firm* — Venable LLP; Robert S. Babayi; Thomas A. Negley

(57) ABSTRACT

The present invention discloses a method and a system for controlling playing of monitoring video record. The controlling playing method includes the following steps: A. during the process of recording a monitoring video record, detecting a picture of a video record in real time and marking a time index for dynamic frame(s) in the video record; B. during the process of playing the monitoring video record, obtaining the lime index and playing the dynamic frame in the monitoring video record according to the time index. The controlling playing system includes: video record recording means, motion detecting means and video record playing means, wherein the video record recording means is configured to record a monitoring video record; the motion detecting means is configured to detect a picture of the video record in real time and mark a time index for a dynamic frame(s) in the video record during the process of recording the monitoring video record by the video record recording means; and the video record playing means is configured to obtain the time index from the motion detecting means and play the dynamic frame(s) in the monitoring video record according to the time index during the process of playing the monitoring video record. The present invention reduces the time of playing monitoring video record greatly without missing any effective information.

14 Claims, 2 Drawing Sheets

(56) References Cited

U.S. PATENT DOCUMENTS

2008/0181462 A1* 7/2008 Ban .............................. 382/107
2008/0205851 A1* 8/2008 Sakai ............................. 386/95

FOREIGN PATENT DOCUMENTS

| CN | 101262596 | A | 9/2008 |
|---|---|---|---|
| EP | 1024666 | A2 | 8/2000 |
| EP | 1184810 | A2 | 3/2002 |
| WO | WO0193590 | A2 | 12/2001 |
| WO | WO2008093321 | A1 | 8/2008 |

OTHER PUBLICATIONS

EPO, European Search Report, Jan. 17, 2012.
FIIP, Russian Examination Report and English Translation, May 12, 2012.

* cited by examiner

METHOD AND SYSTEM FOR CONTROLLING PLAYING OF MONITORING VIDEO RECORD

FIELD OF THE INVENTION

The present invention relates to the field of video monitoring system, and in particular to the technology of playing of monitoring video record, more specifically to a method and a system for controlling playing of monitoring video record.

BACKGROUND OF THE INVENTION

At present, with the development of computer and network technology, a video monitoring system has gradually become an important application in the field such as finance, transportation, commerce, electric power, public security, customs, national defense and residential district.

For this application, the general practice is as follows: the monitoring video record is made by video cameras installed in some important places, then signals of the monitoring video record is transmitted to a server of a specified monitoring center through a certain transmission network, and further the video record data is stored M a storage medium via a storage device, When it is necessary to access the history data of the video record, a related person may access the video record file stored in the medium, watch the video record and search for the information desired.

However, when the video record information is checked, there will always be plenty of static pictures which contain very little information itself and cause a waste of time. For this situation, there are two handling methods at present. One method is to skip the static pictures to shorten the watching time by fast-forward operation, viz. by frame-skipping playing. For streaming media playing, the method can be achieved by increasing the transmission speed of the video stream at the streaming media server side. However, due to the technology used, the above method requires the person watching the record to focus all his/her attention during the fast-forward process, and thus the phenomenon that a part of the effective information is omitted always occurs due to the negligence of the person watching the record. The other method is to manually drag the video record playing progress bar to skip the static pictures so as to shorten the watching time. However, this method is more likely to miss the information desired.

SUMMARY OF THE INVENTION

The present invention is proposed in consideration of the problems existing in the related art that the playing of monitoring video record cannot be effectively controlled. The present invention mainly aims to provide an improved solution for controlling playing of monitoring video record to solve at least one of the above problems in the related art.

In order to achieve the above object, a method for controlling playing of monitoring video record is provided according to one aspect of the present invention.

The method for controlling playing of monitoring video record according to the present invention comprises the following steps:

A. during the process of recording a monitoring video record, detecting a picture of a video record in real time and marking a time index for dynamic frame(s) in the video record;

B. during the process of playing the monitoring video record, obtaining the above time index and playing the dynamic frame in the monitoring video record according to the time index.

Preferably, in this playing controlling method, the dynamic frame(s) comprises at least two dynamic frames, and that the step of marking the time index specifically is marking a start time point and an end time point for each dynamic frame.

Preferably, the start time point and the end time point of each dynamic frame are stored in a time index file corresponding to the monitoring video record.

Further, in the Step A, the step of detecting the picture of the video record in real time and marking the time index for the dynamic frames in the video record is carried out in the following way:

A1. beginning the recording of the monitoring video record, setting a start time flag and a minimum video record mark time period with the start time flag set as true, and marking a moment at which the recording begins as a start time point of a current dynamic frame;

A2. detecting the picture of the video record;

A3. judging whether there is a moving object in the picture of the video record and whether the start time flag is true, and performing one of the following operations according to a result of the judgment:

1) when there is a moving object in the picture of the video record and the start time flag is true, the next step is executed;

2) when there is a moving object in the picture of the video record and the start time flag is false, the start time flag is set as true, the current moment of the video record is marked as the start time point of the current dynamic frame, and the next step is executed;

3) when there is no moving object in the picture of the video record and the start time flag is true, it is judged whether the time difference between the current moment of the video record and the start time point previously recorded is larger than the minimum video record mark time period, wherein if yes, the start time flag is set as false, the current moment of the video record is marked as the end lime point of the current dynamic frame, and the next step is executed; and otherwise, the next step is executed;

4) when there is no moving object in the picture of the video record and the start time flag is false, the next step is executed;

A4. judging whether the recording of the monitoring video record is finished, wherein if the result of the judgment is yes, the next step is performed; otherwise, it returns to the Step A2;

A5. judging whether the start time flag is true, wherein if yes, the start time flag is set as false, and the current moment of the video record is marked as the end time point of the current dynamic frame.

Preferably, in this playing controlling method, the step of detecting the picture of the video record in real time is of detecting a global picture or a local picture of a preset picture of the video record in real time.

Preferably, in this playing controlling method, the playing of the monitoring video record is local playing or remote playing.

A system for controlling playing of monitoring video record is provided according to another aspect of the present invention.

The system for controlling playing of monitoring video record according to the present invention comprises: video record recording means, motion detecting means and video record playing means, wherein the video record recording means is configured to record a monitoring video record; the motion detecting means is configured to detect a picture of the video record in real time and mark a time index for a dynamic frame(s) in the video record during the process of recording the monitoring video record by the video record recording means; and the video record playing means is configured to obtain the time index from the motion detecting means and play the dynamic frames) in the monitoring video record according to the time index during the process of playing the monitoring video record.

Preferably, in this playing controlling system, the picture of the video record detected by the motion detecting means is a global picture or a local picture of a preset picture of the video record.

Preferably, in this playing controlling system, the video record playing means is a local playing means or a remote playing means.

By detecting the picture of the video record in real time and marking a time index for dynamic frame(s) in the video record during the process of recording the monitoring video record, the present invention enables quick positioning of the dynamic frame in the video record via the time index during the process of playing the video record, which not only saves the time of playing, but also effectively avoids missing effective information in the video record during quick playing of the video record.

Other characteristics and advantages of the present invention will be explained in the specification hereinafter, and partly become obvious from the specification, or be understood by implementing the present invention. The object and other advantages of the present invention can be realized and obtained by the structure particularly mentioned in the specification, the claims, and the accompanying drawings.

BRIEF DESCRIPTION OF THE ACCOMPANYING DRAWINGS

DETAILED DESCRIPTION OF EMBODIMENTS

Functions Overview

In consideration of the problems existing in the related art that the playing of monitoring video record cannot be effectively controlled, the embodiments of the present invention provide an improved solution for controlling the playing of monitoring video record. The solution provided by the present embodiment can detect the picture of the video record in real time and mark a time index for dynamic frame(s) in the video record during the process of recording the monitoring video record, so as to enable quick positioning of the dynamic frame in the video record via the time index during the process of playing the video record in the precondition of not missing effective information.

The preferred embodiments of the present invention are detailed in conjunction with the drawings hereinafter. It shall be understood that the preferable embodiments described herein are only used to describe and explain the present invention without unduly limiting the present invention. The embodiments of the present invention and the features of the embodiments can be combined with each other if there is no conflict.

A system for controlling the playing of monitoring video record is first provided according to an embodiment of the present invention, and this system can comprise video record recording means, motion detecting means and video record playing means.

In the above system, the video record recording means is configured to record a monitoring video record; the motion detecting means is configured to detect a picture of the video record in real time and mark a time index for a dynamic frame(s) in the video record during the process of recording the monitoring video record by the video record recording means; and the video record playing means is configured to obtain the time index from the time index file and play the dynamic frame(s) in the monitoring video record according to the time index during the process of playing the monitoring video record.

Specifically, the video record playing means can be local playing means, viz. a client local playing means, or remote playing means, i.e., when streaming media is played, a streaming media server can provide media stream(s) for the client of streaming media according to the time point in the time index file, so as to achieve the same effect as that of local playing of the client.

According to the above controlling system, by detecting the picture of the video record in real time and marking a time index for a dynamic frame(s) in the video record, the dynamic frame(s) in the video record can be positioned quickly via the time index during the process of playing the video record.

A method for controlling playing of monitoring video record is also provided according to an embodiment of the present invention.

Figure 1:
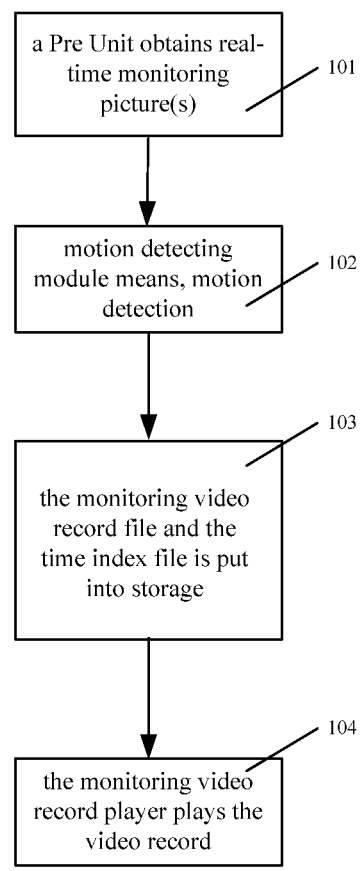
FIG. 1 is a schematic flow chart of the playing controlling method in an embodiment of the present invention.

FIG. 1 is a schematic flow chart of the playing controlling method in an embodiment of the present invention. It shall be noted that the steps shown in the flow chart of the accompanying drawings can be performed in a computer system having a set of computer executable instructions. Moreover, although the logical order is shown in the flow chart, the steps shown or described can be performed in a different order under some situations.

As shown in FIG. 1, the playing controlling method according to an embodiment of the present invention mainly includes the following steps (Step 101 to Step 104).

Step 101, a Pre Unit obtains real-time monitored picture(s) according to the start time and the end time of a video record task.

Step 102, motion detecting means (preferably, this means can be the motion detecting means in the above system for controlling the playing of monitoring video record) performs motion detection in the global picture according to the real-time picture(s) obtained by the monitoring site, and judges whether there is a moving object in the picture, wherein the judging conditions and the range of the motion detection can be set in advance by the system according to requirement, for example, the range of the motion detection can be either the entire picture of the video record or part of the picture of the video record; the judging conditions of the motion detection can include: the object in the current picture of the video record is changed from the state of static to dynamic, or a new object emerges in the picture of the video record or an existing object disappears, and so on; and the occurrence of any of the above situations is deemed as detecting a moving object in the picture of the video record.

Step 103, the system determines the start time and the end time of the video record section of the pictures required by the user according to the result of the judgment of the motion detecting means, and records these time points into a time index file corresponding to the video record file. The process is repeated until the entire video record task is finished, and the time index file and the video record file are put into storage.

Step 104, when the client needs to access the video record file, the video record file and the corresponding time index file are obtained at the same time, and the monitoring video record player reads the time index file, and sequentially plays the monitoring video record according to the start time point and the end time point of the video record section in the time index file.

In the practical monitoring process, in general, the pictures, required by the user performing the monitoring, are pictures when unusual condition occurs, and these picture information required by the user are referred to as effective information. Since the unusual condition generally happens in a sudden, and the user performing the monitoring cannot determine in advance the moment it happens, the monitoring needs to be performed continuously in a relatively long time period. The user performing the monitoring usually can only control the start time and the end time of the monitoring. For example, a certain monitoring site is for a night anti-theft monitoring of a certain building, in which a video record recording means and a video recorder are set with video recorder used for recording the pictures of the gate of the building, wherein this video recorder is configured to start the recording task at 24:00, and end the recording task at 8:00 of the next day. Assuming that a person passes the gate of the building at 5:00, most of the eight-hour pictures of the video record may be ineffective information such as pictures of the ground and the steps before the gate of the building, and it is difficult for the user performing the monitoring to find the desired effective information that a person passes the gate of the building at 5:00 from such a plenty of ineffective information. However, when the present invention is used, since the event that a person passes the gate of the building at 5:00 is the moving object preset by the present invention, the motion detecting means determines that there is a moving object in the picture starting from when the person appears in the picture of the video record at 5:00, and marks the current moment 5:00 of the video record as the start time point of the section of video record, of effective information, and the motion detecting means determines that there is no moving object in the picture when the person has passed the gate of the building at 5:01 and disappears from the picture of the video record, and marks the current moment 5:01 of the video record as the end time point of the section of video record of effective information. In playing the monitoring video record, the user performing the monitoring can quickly position this effective information in the monitoring video record according to the marks of the start time point and the end time point.

It shall be noted that the moving object is not limited to the new object which appears in the picture, and it can also be a change in the state of the existing object. For example, in the above example, if the steps in the monitored picture collapse because of an earthquake and the like, the motion detecting means may also determine that there is a moving object in the picture and mark a time index for this section of effective information.

In the present embodiment, a section of video record containing a moving object is referred to as a dynamic frame in the monitoring video record. In a monitoring video record file, one or more dynamic frames may be included, for example, in the above example, assuming that the steps collapsing event occurs at 6:00, the detecting means re-determines that the moment of having no moving object in the picture is 6:02 when the collapse ends, and then the video record tile can include two dynamic frames, viz. the two dynamic frames of 5:00-5:01 and 6:00-6:02.

Figure 2:
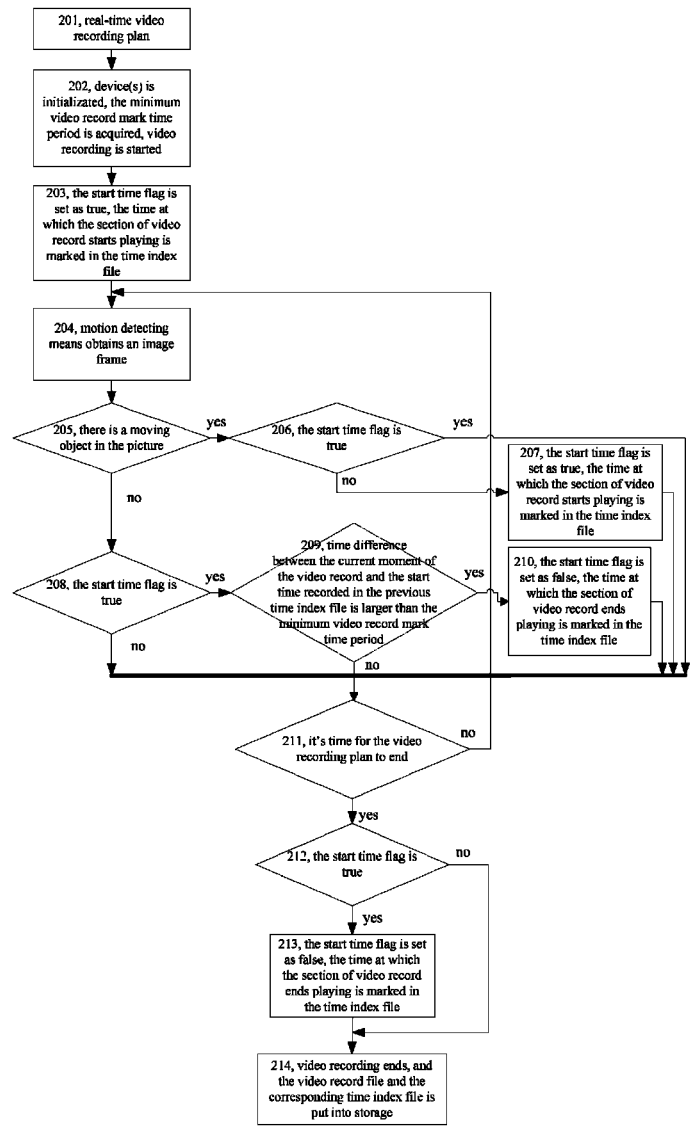
FIG. 2 is a schematic flow chart of the operation of marking a time index in an embodiment of the present invention.

As shown in FIG. 2, the operation of marking time in an embodiment of the present invention mainly includes the following steps (Step 201 to Step 214).

Step 201, the Pre Unit obtains a real-time video recording task plan, and this task may be either a local task or a video recording task on a distant server obtained via the network.

Step 202, device(s) are initialized according to the video recording task, the minimum Video record mark time period m_s is acquired, and video recording is started.

Step 203, the system sets the start time flag as true (m_bStart=TRUE), and records the start time in the time index file, which means that the content to be played from this time point is a section containing effective information.

Step 204, the motion detecting means obtains an image frame, viz. a picture of the video record.

Step 205, the motion detecting means judges whether there. is a moving object in the picture of the image frame, wherein if the result of the judgment is yes, the operation goes to Step 206; otherwise, the operation turns to Step 208.

Step 206, the start time flag is read, and it is judged that whether it is true (m_bStart==TRUE), wherein if the result of the judgment is true, the operation goes to Step 211; otherwise, the operation goes to Step 207.

Step 207, the system sets the start time flag as true (m_bStart=TRUE), and records the start time in the time index file, which indicates that a new video record section is started to be recorded, and it turns to Step 211.

Step 208, the start time flag is read, and it is judged whether it is true (m_bStart==TRUE), wherein if the result of the judgment is true, the flow goes to Step 209; otherwise, it turns to Step 211.

Step 209, the current video recording time is acquired, the time period Δs of recording the current video record section is calculated according to the latest recorded start time of the video record section, and it is judged whether this time period is larger than the minimum video record mark time period (Δs>m_s), wherein if the result of the judgment is yes, it goes to Step 210; otherwise, it turns to Step 211.

Step 210, the system sets the start time flag as false (m_bStart=FALSE), and records the end time in the time index file, which indicates that this video record section containing effective information ends.

Step 211, the current video recording time is acquired, and it is judged whether the whole recording task ends, wherein if the result of the judgment is yes, it goes to Step 212; otherwise, it turns to Step 204.

Step 212, it is judged whether the start time flag is true (m_bStart==TRUE), wherein lithe result of the judgment is true, it turns to Step 214; otherwise, it goes to Step 213.

Step 213, the system sets the start time flag as false (m_bStart=FALSE), and records the end time in the time index file, which indicates that the whole video recording ends.

Step 214, the video recording ends, and the video record file and the corresponding time index file are put into storage for being accessed.

In the above process, the minimum video record mark time period is a preset length of time such as 30 s, and this preset length of time can ensure that each dynamic frame has at least one shortest length of time. Particularly, when there is no moving object appearing during the whole video recording task period, a section of video record will likewise be marked in the time index file according to the above process of marking time index, wherein the start time point of this video record is the start time point of the moment when the video record recording begins, and the end time point is the 30 second after the moment when the video record recording begins. Although this section of video record contains no moving object defined by the preceding contents, as the beginning of the recording is marked herein which reflects the change of the picture coming into existence from inexistence, this section of video record is also defined as a dynamic frame.

Compared with the prior art, the present invention does not make any modification to the monitoring video record itself, and thereby, does not affect the playing of the monitoring video record in an ordinary playing mode. Instead, in the present invention, the time period of playing moving picture containing effective information, i.e. dynamic frame, is marked by introducing the time index file. When the client side accesses this video record file, the player can sequentially play each dynamic frame recorded in the index file according to the corresponding time index file, so as to effectively skip unnecessary information and save the video record playing time.

The present invention does not affect the playing in the ordinary playing mode, but provides another playing mode which can locate automatically and play the moving pictures of monitoring video record without omitting any effective information, which reduces the monitoring video record playing time greatly, and achieves an excellent technical effect.

Obviously, those skilled in the art shall understand that individual means and steps of the present invention can be implemented with general computing devices, they may be integrated in a single computing device or distributed in network formed by a plurality of computing devices, optionally, they may be implemented by using program codes executable by computing devices, thus they may be stored in memory devices for execution by the computing devices, or implemented by making them into Integrated circuit module respectively, or by making several means or steps in to a single IC. Thus, the present invention is not limited to any particular combination of hardware and software.

Of course, there may be many other embodiments for the present invention. Without departing from the spirit and principle of the present invention, those skilled in the art may make various changes and variations according to the present invention, and these changes and variations are all comprised in the scope of the claims of the present invention.

What is claimed is:

1. A method for controlling playing of monitoring video record, comprising the following steps:
   A. during the process of recording a monitoring video record, detecting a picture of a video record in real time and marking a time index for dynamic frame(s) in the video record; and
   B. during the process of playing the monitoring video record, obtaining the time index and playing the dynamic frame in the monitoring video record according to the time index;
   wherein in the Step A, the step of detecting the picture of the video record in real time and marking the time index for the dynamic frames in the video record is carried out in the following way:
   A1. beginning the recording of the monitoring video record, setting a start time flag and a minimum video record mark time period with the start time flag set as true, and marking a moment at which the recording begins as a start time point of a current dynamic frame;
   A2. detecting the picture of the video record;
   A3. judging whether there is a moving object in the picture of the video record and whether the start time flag is true, and performing one of the following operations according to a result of the judgment:

1) when there is a moving object in the picture of the video record and the start time flag is true, the next step is executed;
   2) when there is a moving object in the picture of the video record and the start time flag is false, the start time flag is set as true, the current moment of the video record is marked as the start time point of the current dynamic frame, and the next step is executed;
   3) when there is no moving object in the picture of the video record and the start time flag is true, it is judged whether the time difference between the current moment of the video record and the start time point previously recorded is larger than the minimum video record mark time period, wherein if the result of the judgment is yes, the start time flag is set as false, the current moment of the video record is marked as the end time point of the current dynamic frame, and the next step is executed; and otherwise, the next step is executed;
   4) when there is no moving object in the picture of the video record and the start time flag is false, the next step is executed;
   A4. judging whether the recording of the monitoring video record is finished, wherein if yes, the next step is performed; otherwise, it returns to the Step A2; and
   A5. judging whether the start time flag is true, wherein if yes, the start time flag is set as false, and the current moment of the video record is marked as the end time point of the current dynamic frame.

2. The method for controlling playing of monitoring video record according to claim 1, wherein the dynamic frame(s) comprises at least two dynamic frames, and that the step of marking the time index specifically is: marking a start time point and an end time point for each dynamic frame.

3. The method for controlling playing of monitoring video record according to claim 2, wherein the start time point and the end time point of each dynamic frame are stored in a time index file corresponding to the monitoring video record.

4. The method for controlling playing of monitoring video record according to claim 3, wherein the step of detecting the picture of the video record in real time is of detecting a global picture or a local picture of a preset picture of the video record in real time.

5. The method for controlling playing of monitoring video record according to claim 3, wherein the playing of the monitoring video record is local playing or remote playing.

6. The method for controlling playing of monitoring video record according to claim 2, wherein the step of detecting the picture of the video record in real time is of detecting a global picture or a local picture of a preset picture of the video record in real time.

7. The method for controlling playing of monitoring video record according to claim 2, wherein the playing of the monitoring video record is local playing or remote playing.

8. The method for controlling playing of monitoring video record according to claim 1, wherein the step of detecting the picture of the video record in real time is of detecting a global picture or a local picture of a preset picture of the video record in real time.

9. The method for controlling playing of monitoring video record according to claim 1, wherein the playing of the monitoring video record is local playing or remote playing.

10. The method for controlling playing of monitoring video record according to claim 1, wherein the step of detecting the picture of the video record in real time is of detecting a global picture or a local picture of a preset picture of the video record in real time.

11. The method for controlling playing of monitoring video record according to claim 1, wherein the playing of the monitoring video record is local playing or remote playing.

12. A system for controlling playing of monitoring video record, comprising: video record recording means, motion detecting means and video record playing means, wherein the video record recording means is configured to record a monitoring video record; the motion detecting means is configured to detect a picture of the video record in real time and mark a time index for a dynamic frame(s) in the video record during the process of recording the monitoring video record by the video record recording means; and the video record playing means is configured to obtain the time index from the motion detecting means and play the dynamic frame(s) in the monitoring video record according to the time index during the process of playing the monitoring video record;

wherein the motion detecting means comprises a processor coupled to a memory, and the processor is configured to execute the following steps:

A1. beginning the recording of the monitoring video record, setting a start time flag and a minimum video record mark time period with the start time flag set as true, and marking a moment at which the recording begins as a start time point of a current dynamic frame;

A2. detecting the picture of the video record;

A3. judging whether there is a moving object in the picture of the video record and whether the start time flag is true, and performing one of the following operations according to a result of the judgment:

1) when there is a moving object in the picture of the video record and the start time flag is true, the next step is executed;

2) when there is a moving object in the picture of the video record and the start time flag is false, the start time flag is set as true, the current moment of the video record is marked as the start time point of the current dynamic frame, and the next step is executed;

3) when there is no moving object in the picture of the video record and the start time flag is true, it is judged whether the time difference between the current moment of the video record and the start time point previously recorded is larger than the minimum video record mark time period, wherein if the result of the judgment is yes, the start time flag is set as false, the current moment of the video record is marked as the end time point of the current dynamic frame, and the next step is executed; and otherwise, the next step is executed;

4) when there is no moving object in the picture of the video record and the start time flag is false, the next step is executed;

A4. judging whether the recording of the monitoring video record is finished, wherein if yes, the next step is performed; otherwise, it returns to the Step A2; and A5. judging whether the start time flag is true, wherein if yes, the start time flag is set as false, and the current moment of the video record is marked as the end time point of the current dynamic frame.

13. The system for controlling playing of monitoring video record according to claim 12, wherein the picture of the video record detected by the motion detecting means is a global picture or a local picture of a preset picture of the video record.

14. The system for controlling playing of monitoring video record according to claim 12, wherein the video record playing means is a local playing means or a remote playing means.

* * * * *